United States Patent
Jefferson et al.

(10) Patent No.: US 6,233,563 B1
(45) Date of Patent: May 15, 2001

(54) INSURANCE VERIFICATION SYSTEM AND METHOD

(76) Inventors: Moses O. Jefferson, 11640 Haynes, New Orleans, LA (US) 70128; William J. Jefferson, 1922 Marengo, New Orleans, LA (US) 70115

(*) Notice: Subject to any disclaimer, the term of this patent is extended or adjusted under 35 U.S.C. 154(b) by 0 days.

(21) Appl. No.: 09/245,859

(22) Filed: Feb. 8, 1999

(51) Int. Cl.[7] .................................................. G06F 17/30
(52) U.S. Cl. ........................................................ 705/4
(58) Field of Search .................................. 186/53; 705/4; 235/384, 382, 381, 380

(56) References Cited

U.S. PATENT DOCUMENTS

| | | | |
|---|---|---|---|
| 3,786,421 | * 1/1974 | Wostl et al. | 235/381 |
| 4,085,313 | * 4/1978 | Van Ness | 235/381 |
| 4,727,243 | * 2/1988 | Savar | 705/17 |
| 4,857,714 | * 8/1989 | Sunyich | 235/382 |
| 4,900,906 | * 2/1990 | Pusic | 235/381 |
| 4,982,072 | * 1/1991 | Takigami | 235/384 |
| 5,325,291 | 6/1994 | Garrett et al. . | |
| 5,327,066 | * 7/1994 | Smith | 320/109 |
| 5,459,304 | 10/1995 | Eisenmsnn . | |
| 5,790,410 | * 8/1998 | Warn et al. | 700/232 |
| 5,797,470 | 8/1998 | Bohnert et al. . | |
| 5,845,256 | 12/1998 | Pescitelli et al. . | |

FOREIGN PATENT DOCUMENTS

| | | | |
|---|---|---|---|
| 2091461A | * 7/1982 | (GB) | G07F/7/10 |
| 405012568 | * 1/1993 | (JP) | G07G/1/12 |

OTHER PUBLICATIONS

Berg, Douglas and others. Pay–at–the–pump auto insurance: Could it Work? "CPCU Journal" (Sep. 1994) vol. 47, No. 3, pp. 140–151 [pp. 1–15].*

* cited by examiner

Primary Examiner—James P. Trammell
Assistant Examiner—John Leonard Young
(74) Attorney, Agent, or Firm—Burns, Doane, Swecker & Mathis, L.L.P.

(57) ABSTRACT

The present invention provides a system and method for quickly and accurately verifying the existence of vehicle insurance. According to exemplary embodiments of the present invention, a nationwide vehicle insurance database is created for storing a real-time record of all vehicle policyholders throughout the country. At the time when gasoline is purchased, the existence of a motorist's vehicle insurance is verified. When it is determined that the motorist lacks vehicle insurance, the purchase of gasoline is denied. As a result, the number of uninsured motorists can be reduced.

29 Claims, 5 Drawing Sheets

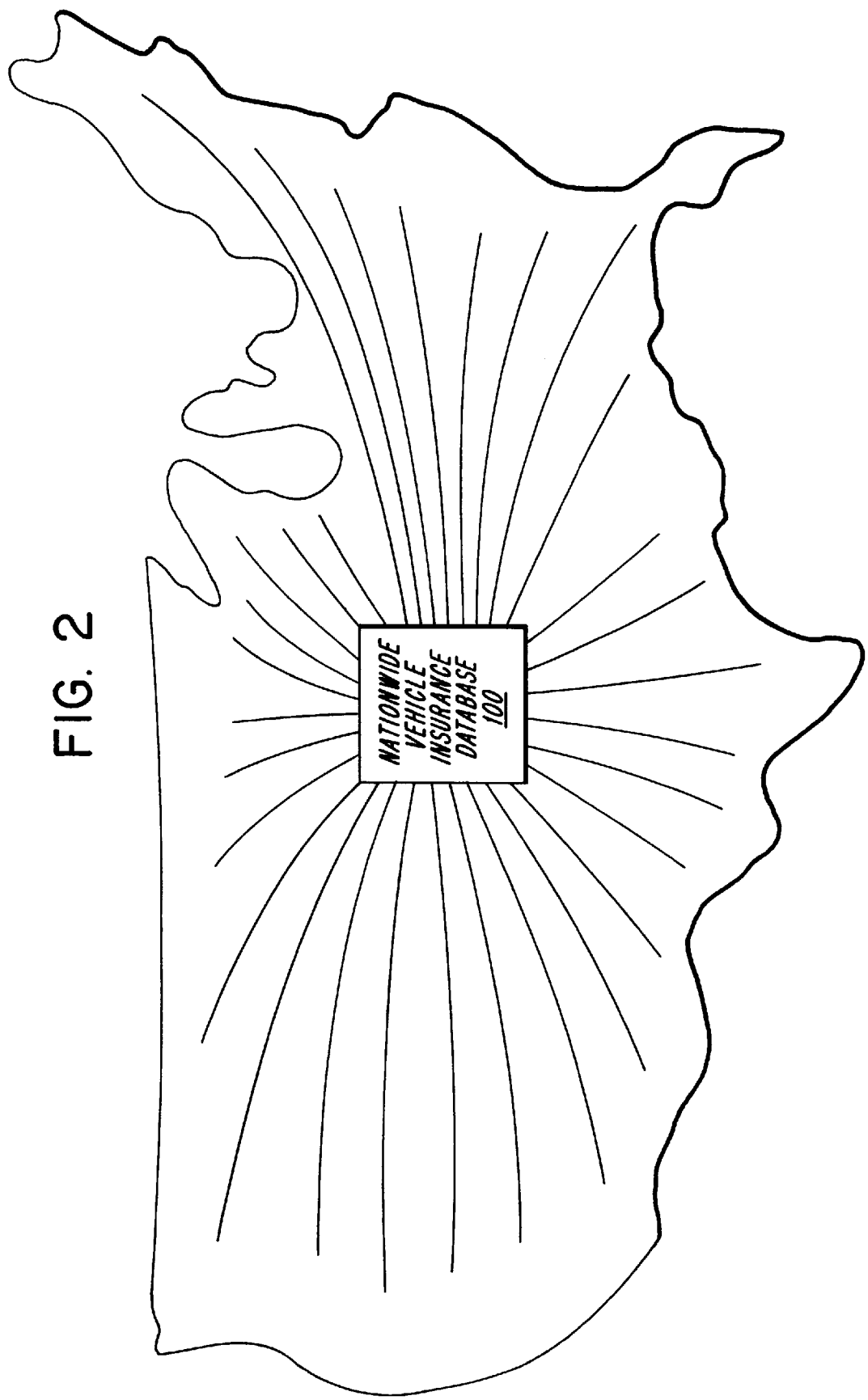

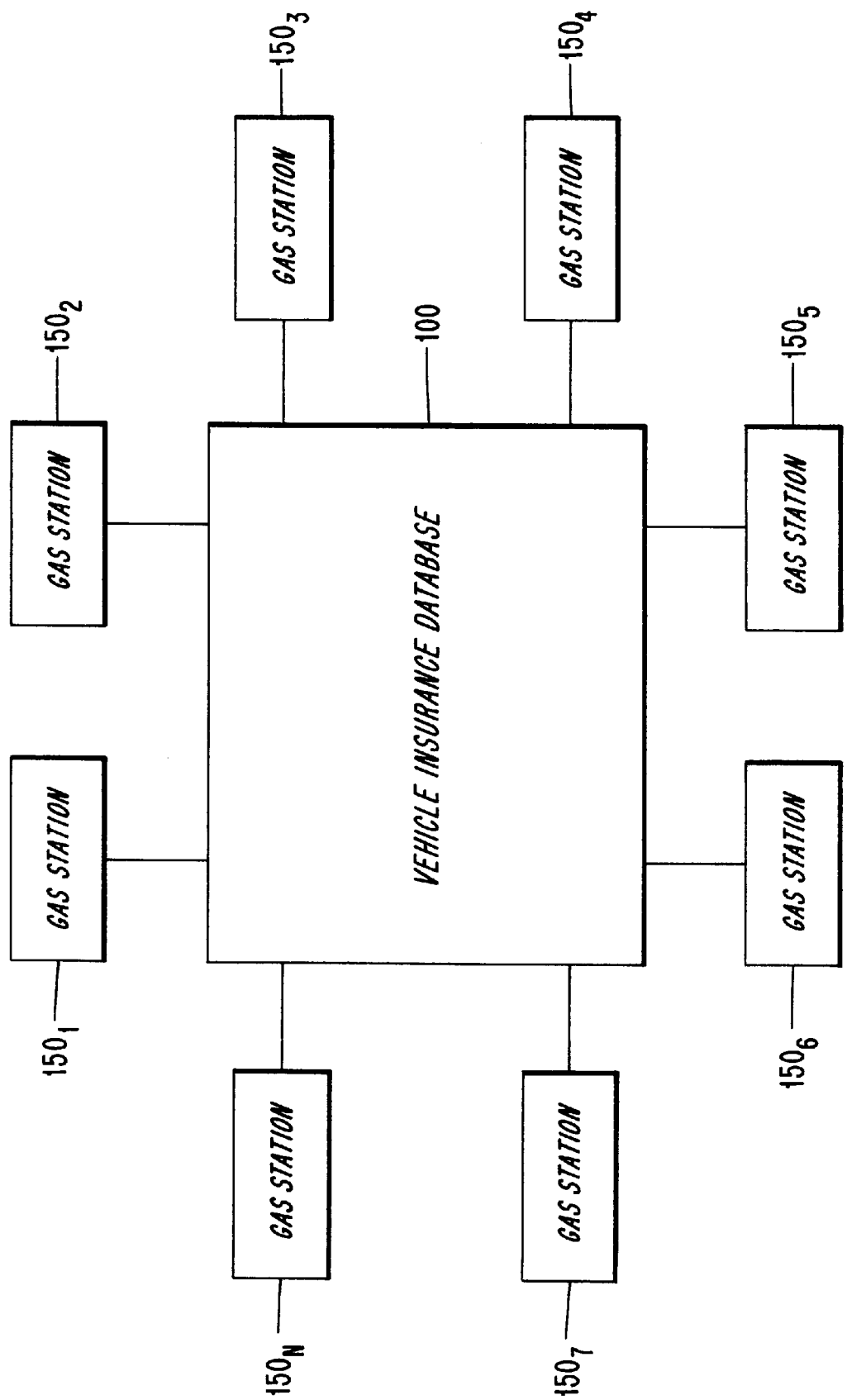

INSURANCE VERIFICATION SYSTEM AND METHOD

BACKGROUND

The present invention relates generally to verification systems and, more particularly, to a system and method for instantly verifying the presence of vehicle insurance coverage.

Insurance rates in many states are reaching astronomical proportions. This is due, in part, to the existence of uninsured motorists. The relationship that exists between the number of uninsured motorists and insurance rates is quite apparent. Simply put, increases in automobile insurance premiums lead to more people being unable to afford insurance, which results in an increase in the number of vehicles being operated by people who do not have insurance, which leads to increases in automobile insurance premiums. Today, millions of vehicles are operated each day throughout the United States by motorists who have not purchased automobile insurance. When an automobile accident is caused by one of these uninsured motorists, the uninsured motorist is forced to pay the resulting damages. More often than not, the uninsured motorist lacks the resources to pay the damages thereby forcing the insured motorist to pay out of pocket. As a result, insurance companies have developed an insurance plan, called "uninsured motorist coverage", in order to lessen insured motorists' out of pocket expenses. Today, uninsured motorist coverage alone costs insured motorists billions of dollars each year.

When a motorist purchases vehicle insurance from an insurance company, the insurance company generally issues the motorist one card for each person to be insured and one card for each vehicle insured. Once vehicle coverage is obtained, it is generally only verified during those rare instances in which the motorist is involved in an accident. In those states having mandatory vehicle insurance statutes, verification may also occur during stops for traffic violations.

One major problem with these types of insurance verification techniques is evident. It is well established that many insurance companies allow for insurance premiums to be paid in monthly installments. Insurance cards are issued after the first payment indicating that the motorist is insured for a certain period of time, generally 6 months. If, after the first payment, the motorist does not make any additional premium payments, the insurance coverage will no longer exist even though the motorist's insurance card indicates that the motorist is insured for an additional five months. The above-described verification techniques cannot detect this lapse in insurance coverage.

There exists a need for a system which reduces or eliminates the number of uninsured motorists. The ability to quickly and accurately determine the existence of a motorist's automobile insurance will aid in reducing the number of uninsured motorists.

SUMMARY

The present invention seeks to overcome the above-identified deficiencies by providing a system and method for quickly and accurately verifying the existence of vehicle insurance. According to exemplary embodiments of the present invention, a nationwide vehicle insurance database is created for storing a real-time record of vehicle policyholders throughout the country. At the time when gasoline is purchased, the existence of a motorist's vehicle insurance is verified. When it is determined that the motorist lacks vehicle insurance, the purchase of gasoline is denied. As a result, the number of uninsured motorists can be reduced.

BRIEF DESCRIPTION OF THE DRAWINGS

The above objects and features of the present invention will be more apparent from the following description of the preferred embodiments with reference to the accompanying drawings, wherein:

FIG. 2 illustrates a generalized overview of the nationwide vehicle insurance verification system of the present invention;

FIG. 3 illustrates a simplified block diagram of the vehicle insurance verification system according to an embodiment of the present invention;

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Current vehicle insurance premiums are driven in part by the large number of uninsured motorists on the road. Conventional techniques for verifying a motorist's vehicle insurance coverage are unable to accurately determine the current status of that insurance. Therefore, there exists a need for a system which can provide, in real time, the status of a motorist's insurance coverage so as to reduce or eliminate the number of uninsured motorists.

The present invention provides a system and method for accurately determining a motorist's insurance coverage at a time when gasoline is purchased. The technology currently exists for verifying a person's credit card information at a gas station. The present invention seeks to utilize similar technology for verifying the existence of vehicle insurance.

According to exemplary embodiments of the present invention, a nationwide vehicle insurance database is created in a manner similar to the one currently available for credit card verification. Insurance companies can, either directly or indirectly, provide the information needed to keep a real-time record of all their vehicle policyholders in the database. At the time vehicle insurance is purchased, the insurance agent issues insurance cards to the policyholder, one card for each vehicle insured and one card for each person insured.

Figure 1A:
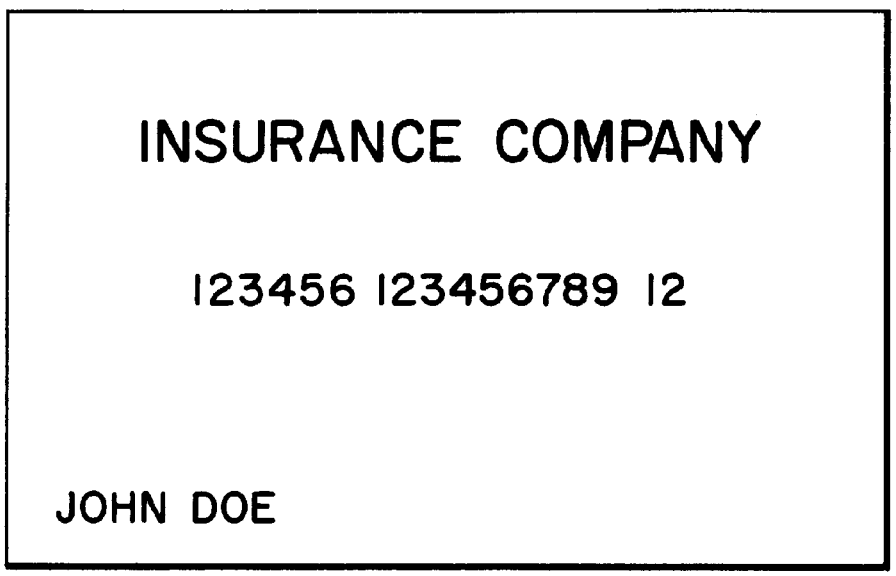
FIGS. 1A and 1B illustrate front and back views of an exemplary insurance card of the present invention.
Figure 1B:
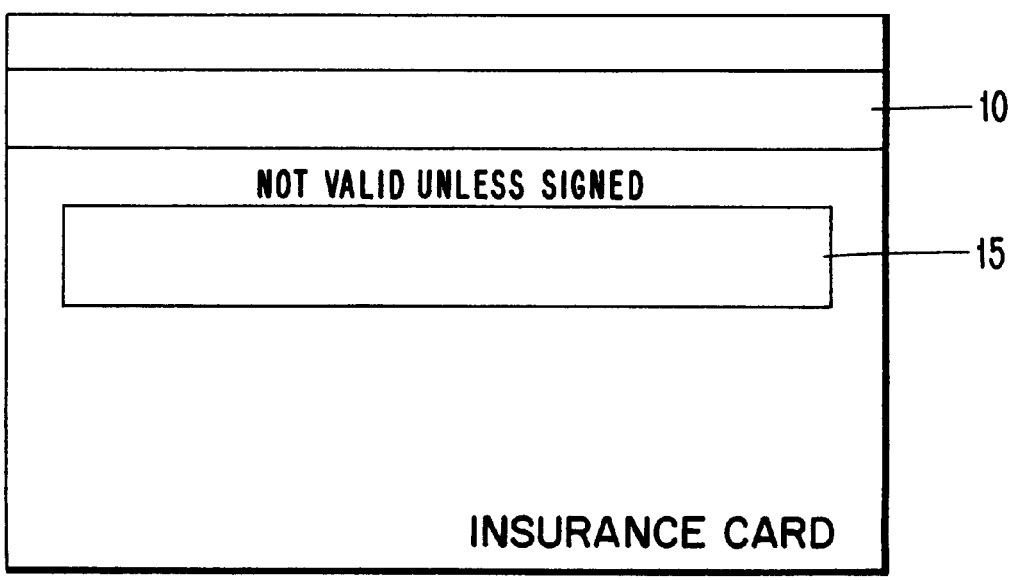

FIGS. 1A and 1B illustrate front and back views, respectively, of an exemplary insurance card of the present invention. As illustrated, the exemplary insurance card resembles a credit card. The front of the card, as illustrated in FIG. 1A, includes the name of the insurance company that issued the card, the policyholder's name and identification number. It will be appreciated that the card may also include other information, such as an expiration date. The back of the insurance card, as illustrated in FIG. 1B, includes a magnetic strip 10 and an area 15 in which the policyholder is to sign the card. The magnetic strip 10 contains all the information necessary to allow the nationwide database to verify that the cardholder has current vehicle insurance. One skilled in the art will appreciate that the insurance card illustrated in FIGS. 1A and 1B is merely exemplary and that other card types and configurations may alternatively be used.

FIG. 2 illustrates a generalized overview of the vehicle insurance verification system of the present invention. As set forth above, the vehicle insurance database 100 contains a real-time record of vehicle insurance coverage for motorists throughout the United States. Each state is tied into the vehicle insurance database 100 so as to allow for a determination of the existence of vehicle insurance irrespective of the geographic location of the motorist. The vehicle insurance database 100 may be constructed such that it simply contains a one bit field for each policyholder throughout the country which identifies either the presence or absence of current vehicle insurance. Alternatively, each policyholder could be associated with a plurality of fields in the database which indicates such information as the motorist's state of residence or address, social security number, driver's license number or other information of interest.

One skilled in the art will appreciate that the single vehicle insurance database 100 depicted in FIG. 2 is provided merely by way of example, and that the vehicle insurance database may actually be comprised of several databases which are tied together throughout the United States. For example, each state may comprise a vehicle insurance database which contains a real-time record of vehicle policyholders in that particular state. In such an event, it is important to provide each state with access to the databases of other states or that a nationwide database also exist so as to allow for vehicle insurance verification during interstate travel.

FIG. 3 illustrates a simplified block diagram of the vehicle insurance verification system of the present invention. As illustrated, a plurality of gas stations $150_1$–$150_N$, which may be located in a single state or located in different states, are connected to the vehicle insurance database 100. As set forth above, the vehicle insurance database 100 may either be one that is dedicated to a particular state or a nationwide database. The individual gas stations $150_1$–$150_N$ are connected to the vehicle insurance database 100 via a wire (e.g., telephone) line, a cellular connection, or some other similar type of connection.

According to exemplary embodiments of the present invention, when fuel is purchased, a motorist's insurance identification number is entered by, for example, swiping the insurance card or manually entering the motorist's identification information. Similar to the manner in which a person's credit card information is verified, upon entering the motorist's identification information, the network verifies the presence or absence of vehicle insurance prior to authorizing the fuel sale.

Figure 4:
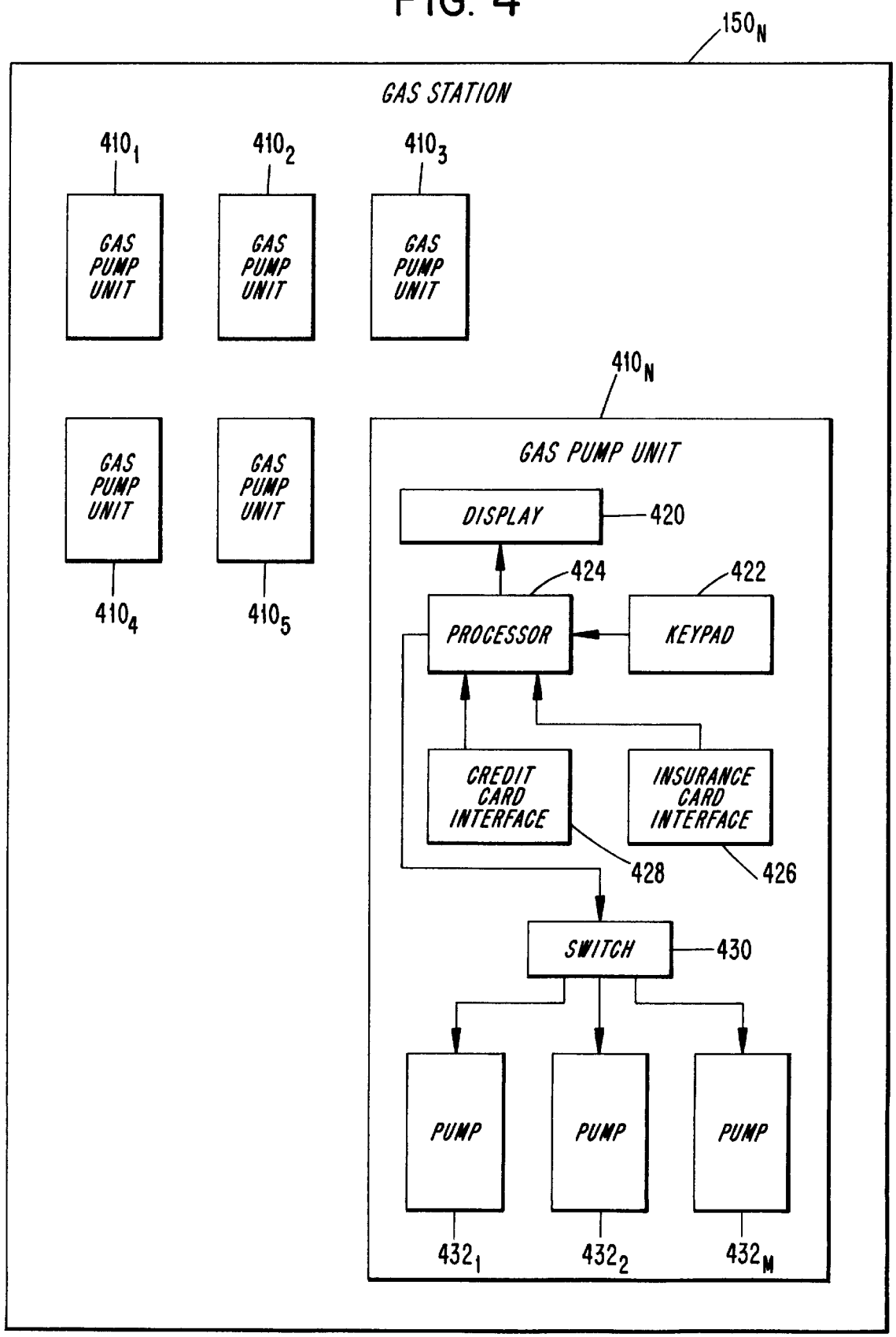
FIG. 4 illustrates an exemplary gas station implementing the vehicle insurance verification system according to a first embodiment of the present invention.

FIG. 4 illustrates an exemplary gas station implementing the vehicle insurance verification system according to a first embodiment of the present invention. As illustrated, the gas station $150_N$ comprises a plurality of gas pump units $410_1$–$410_N$. Each gas pump unit $410_1$–$410_N$, according to this embodiment, is capable of, in addition to providing gas, accepting credit card payments and verifying the current status of a motorist's vehicle insurance. Each gas pump unit $410_1$–$410_N$ comprises a display unit 420 for providing the motorist with, inter alia, instructions for operating the gas pump unit, a keypad 422 which allows for manual entry of information by the motorist and a processor 424 which controls the overall operation of the gas pump unit. The gas pump units $410_1$–$410_N$ also comprise a credit card interface 428 that allows for entry (e.g., via swiping) of the motorist's credit card information, an insurance card interface 426 that allows for entry of the motorist's insurance identification information, a switch 430 and a plurality of individual pumps $432_1$–$432_M$. One skilled in the art will appreciate that the credit card interface and insurance card interface may actually be a single interface which allows for entry of both the credit card and insurance identification information.

In operation, a motorist, wanting to purchase gasoline, indicates via the keypad 422 a desire to pay at the pump. The display unit 420 instructs the motorist to enter the credit card information via, for example, swiping the card at the credit card interface 428. Upon verification of the credit card, the display instructs the motorist to enter the insurance identification information at the insurance card interface 426. In response to entry of this information, the motorist's insurance identification is transferred to the vehicle insurance database for insurance verification purposes. The vehicle insurance database determines, in a well known manner, the presence or absence of vehicle insurance for that particular motorist. Upon a determination that the motorist lacks vehicle insurance, the gas pump unit is notified of such and this information is displayed to the motorist. In such an event, the motorist is denied the purchase of gasoline. On the other hand, when the gas pump unit is notified that the motorist currently has vehicle insurance, the display unit 420 displays an indication that fueling may begin. Simultaneously, processor 424 activates switch 430 to thereby enable pumps $432_1$–$432_M$. One skilled in the art will appreciate that, in those situations where a motorist does not desire to pay at the pump or a gas station is not equipped to allow for a motorist to pay at the pump, a gas attendant may perform the entry of the insurance identification information into a payment terminal.

Figure 5:
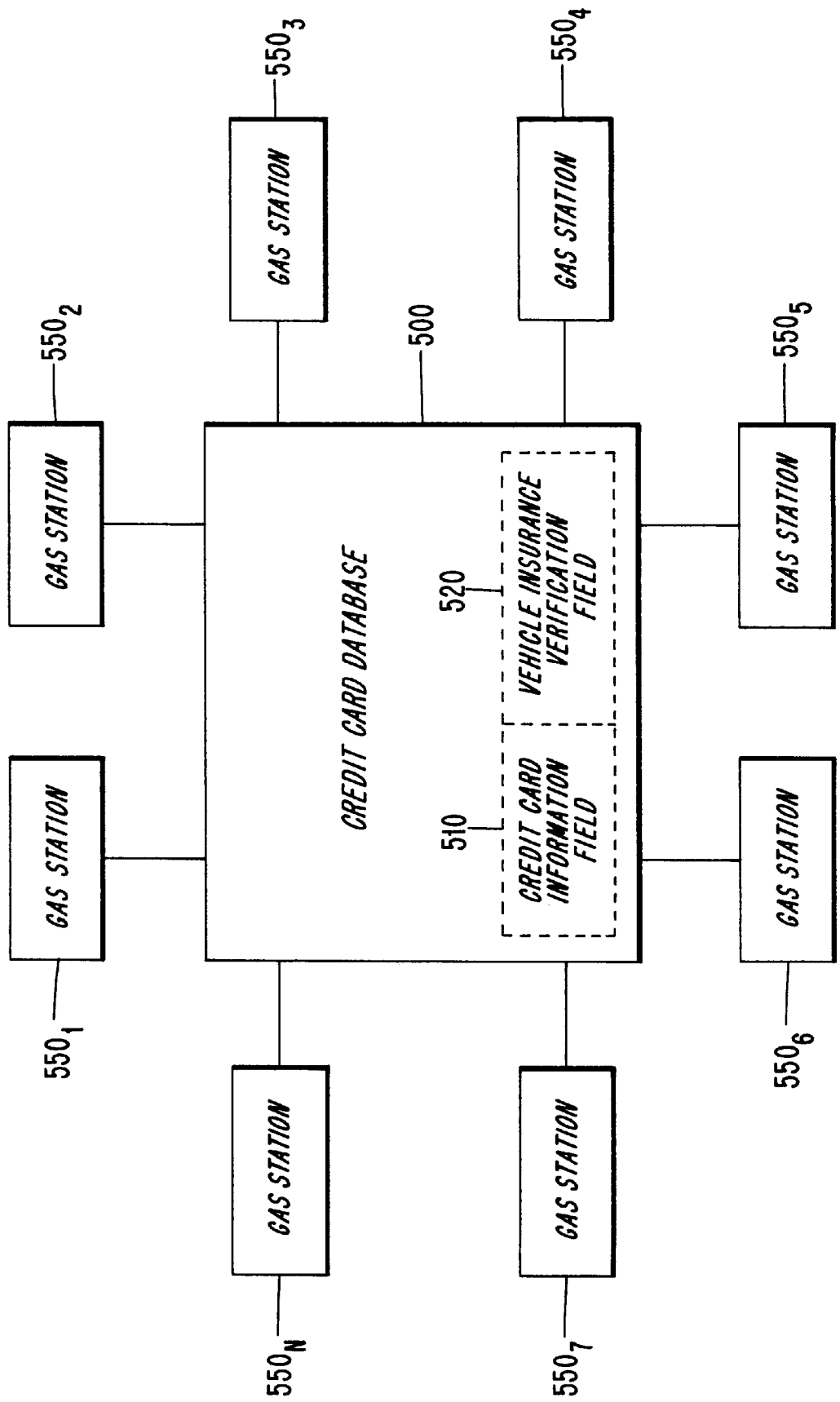
FIG. 5 illustrates a simplified block diagram of the vehicle insurance verification system according to a second embodiment of the present invention.

FIG. 5 illustrates a simplified block diagram of the vehicle insurance verification system according to a second embodiment of the present invention. According to the second embodiment, the conventional credit card verification system is altered to allow for simultaneous verification of a motorist's vehicle insurance and credit. Major credit card issuers can create a new field in their credit card verification database. This new field contains the status of the credit cardholder's vehicle insurance (i.e., current or expired). This field is updated daily from the nationwide vehicle insurance database so that an up-to-date indication may be determined. Therefore, according to this embodiment, when a motorist's pays by credit card, the motorist's credit card information and vehicle insurance coverage are simultaneously checked. Of course, when a motorist wishes to pay by cash, the motorist would need to carry the above-describe insurance card so that insurance verification can be performed.

As illustrated in FIG. 5, a plurality of gas stations $550_1$–$550_N$ are connected to the credit card database 500. The credit card database, according to the second embodiment of the present invention, associates, with each credit cardholder, a credit card information field 510 and a vehicle insurance verification field 520. As such, when a motorist, wishing to purchase fuel, swipes a credit card for payment purposes, the credit card database 500 checks both the motorist's credit card information and insurance information. When the credit card database 500 indicates that the motorist lacks vehicle insurance, the fuel purchase is denied.

In an attempt to minimize fraud, the nationwide vehicle insurance database of the present invention associates a specific field with each policyholder so as to monitor the number of gallons of fuel purchased per vehicle insured and reports excessive volume of purchases to states or municipalities for investigation. According to the present invention, fuel purchases of, for example, two gallons or less do not require vehicle insurance verification so as to allow for fuel purchases for lawnmowers, generators, etc. by those who are not insured. Verification from the nationwide vehicle insurance database that this two-gallon exclusion is not being abused, is accomplished by entering the identification (e.g., social security number or driver's license number) of each purchaser and keeping a total of the number of gallons purchased. Such purchases would be limited to two gallons per week unless there was an emergency, such as a hurricane.

In addition to verifying the existence of automobile insurance at the time fuel is purchased, one skilled in the art will appreciate that the insurance verification system of the present invention could also aid police departments in determining, in those states in which vehicle insurance is mandatory, motorists who are uninsured. By providing police officers with access to the nationwide vehicle insurance database of the present invention, a quick and accurate determination can be made as to whether a particular motorist has automobile insurance.

It is evident from the above-described embodiments that, by denying people who lack vehicle insurance the ability to purchase gasoline, the number of uninsured motorists on the road can be drastically reduced. As a result of reducing the number of uninsured motorists, insurance companies can offer lower vehicle insurance premiums thereby making insurance coverage more affordable.

The foregoing has described the principles, preferred embodiments and modes of operation of the present invention. However, the invention should not be construed as being limited to the particular embodiments discussed above. For example, while the exemplary embodiments described above set forth a nationwide vehicle insurance database, one skilled in the art will appreciate that the vehicle insurance verification system could also be implemented solely on a statewide basis. Moreover, while the above-described embodiments verified a motorist's insurance coverage at a time when gasoline is purchased, it will be appreciated that insurance verification could also be performed when other types of fuel (e.g., diesel fuel for trucks, battery recharging for electric cars, etc.) is purchased. Thus, the above-described embodiments should be regarded as illustrative rather than restrictive, and it should be appreciated that variations may be made in those embodiments by workers skilled in the art without departing from the scope of the present invention as defined by the following claims.

In the claims:

1. A method for providing fuel, the method comprising the steps of:
    inputting identification information of a motorist;
    accessing a vehicle insurance database;
    verifying a status of said motorist's vehicle insurance; and
    activating, in response to the verifying step, a fuel pump.
2. The method of claim 1 wherein the step of inputting the identification information further comprises the steps of:
    swiping an insurance card; and
    reading the identification information contained within the insurance card.
3. The method of claim 2 wherein the step of reading the identification information further comprises the step of:
    reading a magnetic strip of the insurance card.
4. The method of claim 1 wherein the step of inputting the identification information further comprises the steps of:
    swiping a credit card; and
    reading the identification information contained within the credit card.
5. The method of claim 4 wherein the step of reading the identification information further comprises the step of:
    reading a magnetic strip of the credit card.
6. The method of claim 1 wherein the step of verifying further comprises the step of:
    analyzing at least one record of vehicle insurance policyholders from at least one insurance company stored in the database.
7. The method of claim 1 further comprising the steps of:
    inputting security information of the motorist; and
    verifying said security information by accessing the database.
8. The method of claim 7 wherein the step of inputting the security information further comprises the step of:
    swiping an identification card.
9. The method of claim 7 wherein the step of inputting the security information further comprises the step of:
    entering the security information by using a keypad.
10. The method of claim 1 wherein
    the status indicates that the motorist has or does not have vehicle insurance, and
    the fuel pump is activated only when the motorist has vehicle insurance.
11. The method of claim 1 wherein the identification information is contained within an insurance card.
12. The method of claim 11 wherein the insurance card comprises a magnetic strip.
13. A system for providing fuel, the system comprising:
    means for inputting identification of a motorist;
    means for accessing a vehicle insurance database;
    means for verifying a status of said motorist's vehicle insurance; and
    means for activating a fuel pump when the vehicle insurance is determined to exist.
14. The system of claim 13 wherein the means for inputting the identification information further comprises:
    means for reading the identification information contained within an insurance card.
15. The system of claim 14 wherein the means for reading further comprises:
    means for reading a magnetic strip of the insurance card.
16. The system of claim 13 wherein the means for inputting the identification information further comprises:
    means for reading the identification information contained within a credit card.
17. The system of claim 16 wherein the means for reading the identification information further comprises:
    means for reading a magnetic strip of the credit card.
18. The system of claim 13 wherein the means for verifying further comprises:
    means for analyzing at least one record of vehicle insurance policyholders from at least one insurance company stored in the database.
19. The system of claim 13 further comprising:
    means for inputting security information of the motorist; and means for verifying said security information by accessing the database.

20. The system of claim 19 wherein the means for inputting the security information further comprises a keypad.

21. The system of claim 13 wherein the identification information is contained within an insurance card.

22. The system of claim 21 wherein the insurance card comprises a magnetic strip.

23. A method for verifying a status of vehicle insurance, the method comprising the steps of:
   inputting a motorist's credit card information; and
   determining, in response to the inputting step, a status of vehicle insurance for the motorist by accessing a database containing a plurality of records, wherein each of said plurality of records has at least a credit card information field and a vehicle insurance information field.

24. The method of claim 23 wherein the status indicates that the motorist has or does not have vehicle insurance.

25. The method of claim 23 wherein the status is determined when the motorist purchases fuel.

26. A system for verifying a status of vehicle insurance, the system comprising:
   means for inputting a motorist's credit card information; and
   means for determining, in response to the inputting step, a status of vehicle insurance for the motorist by accessing a database containing a plurality of records, wherein each of said plurality of records has at least a credit card information field and a vehicle insurance information field.

27. The system of claim 26 wherein the status indicates that the motorist has or does not have vehicle insurance.

28. The system of claim 26 wherein the status is determined when the motorist purchases fuel.

29. The system of claim 6 wherein the means for determining the status of vehicle insurance is located at a gas pump.

* * * * *

UNITED STATES PATENT AND TRADEMARK OFFICE
CERTIFICATE OF CORRECTION

PATENT NO. : 6,233,563 B1
DATED : May 15, 2001
INVENTOR(S) : Mose O. Jefferson et al.

It is certified that error appears in the above-identified patent and that said Letters Patent is hereby corrected as shown below:

<u>Title page,</u>
Item [76], Inventors: delete "Moses" and insert therefor -- Mose --

Signed and Sealed this

Fourth Day of February, 2003

JAMES E. ROGAN
*Director of the United States Patent and Trademark Office*